June 9, 1964 C. O. WRIGHT 3,136,611
GRAIN DRIERS

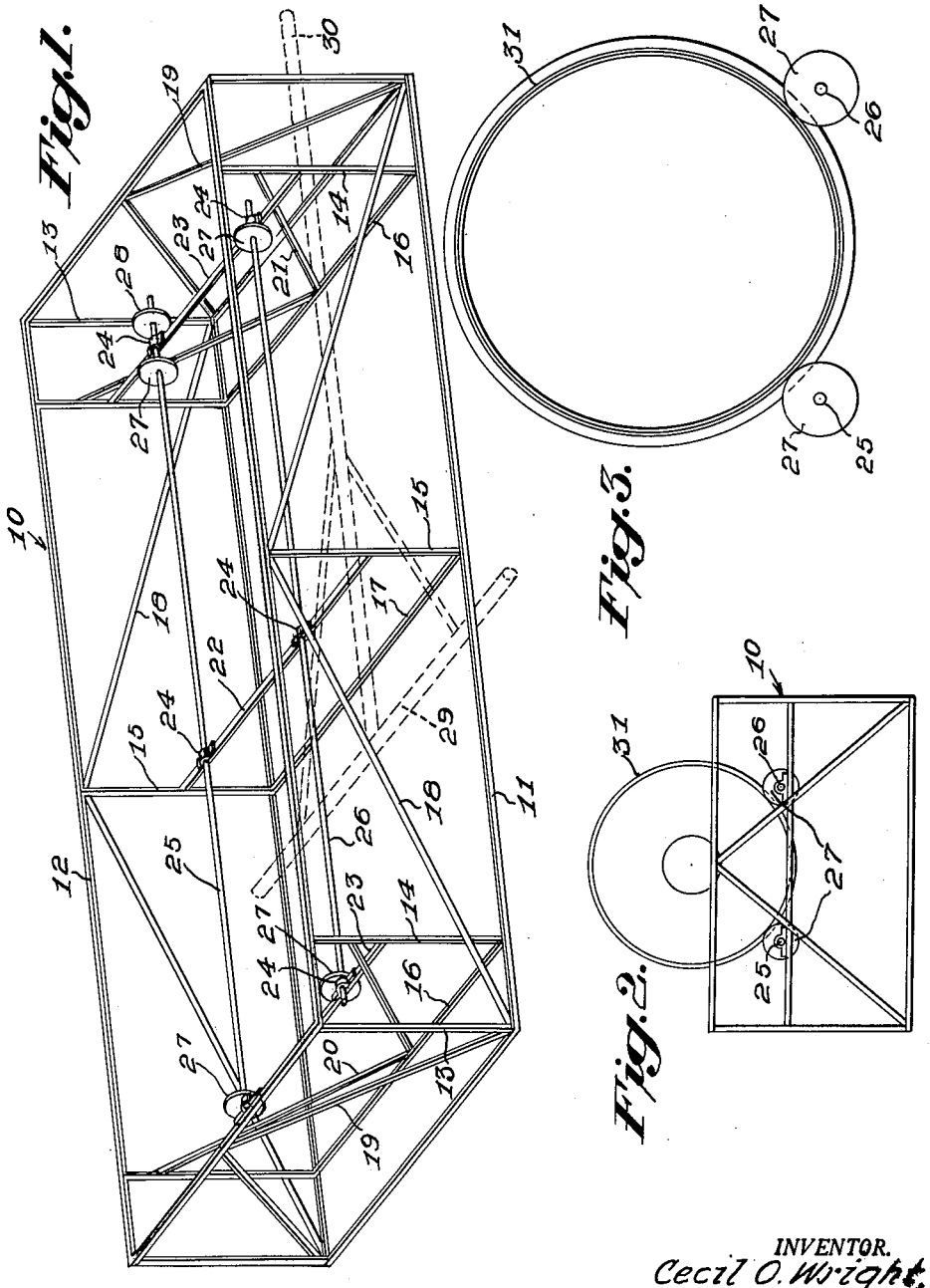

Filed Dec. 7, 1960 6 Sheets-Sheet 2

INVENTOR.
Cecil O. Wright
BY Stone & Mack
Attorneys.

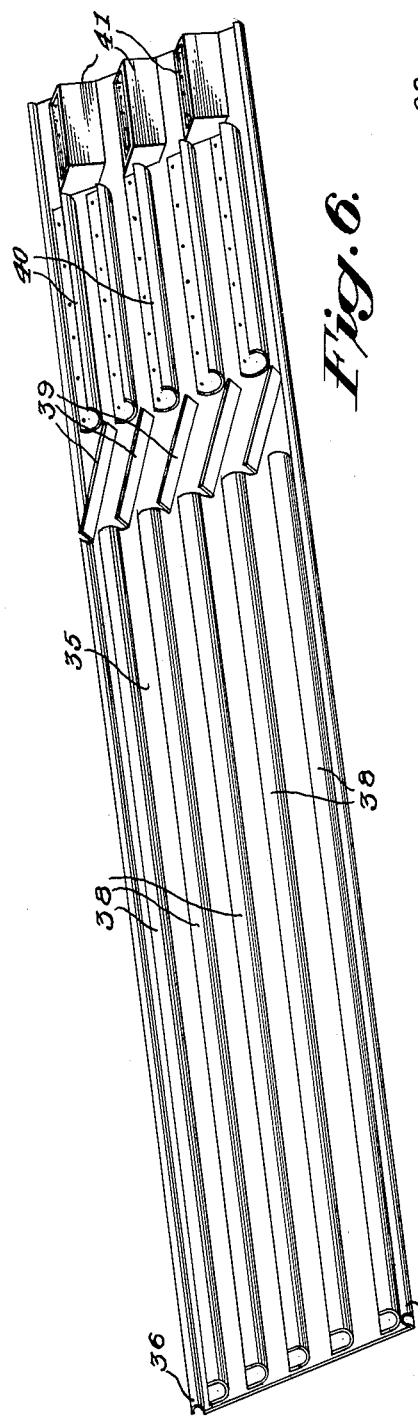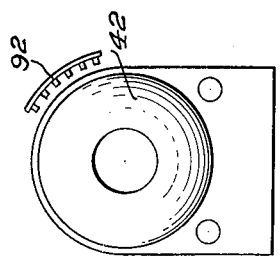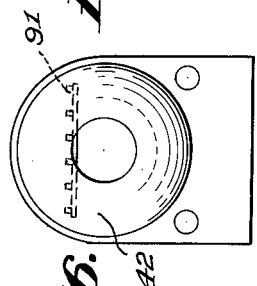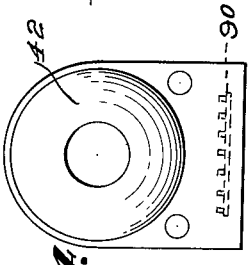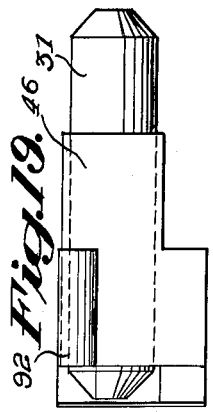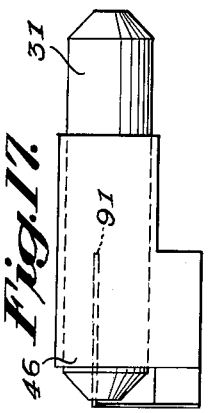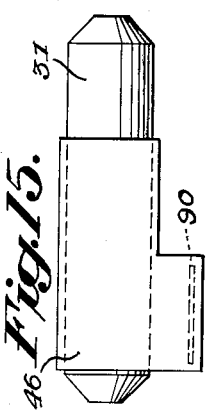

June 9, 1964 C. O. WRIGHT 3,136,611
GRAIN DRIERS
Filed Dec. 7, 1960 6 Sheets-Sheet 4
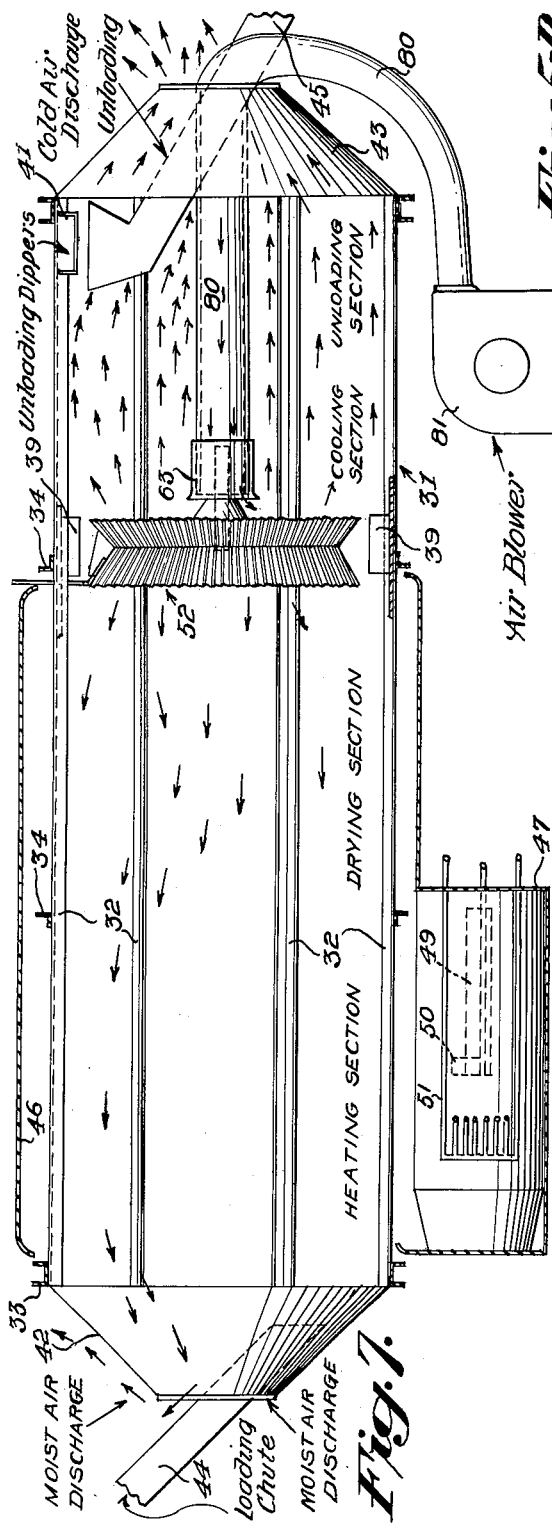
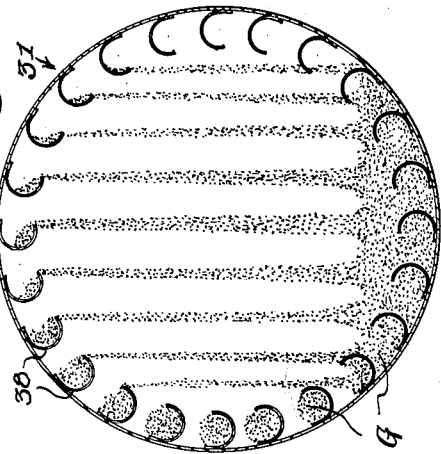
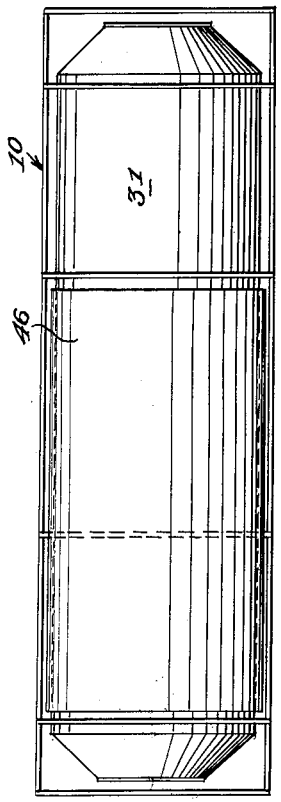
INVENTOR.
Cecil O. Wright,
BY Stone + Mack.
Attorneys.

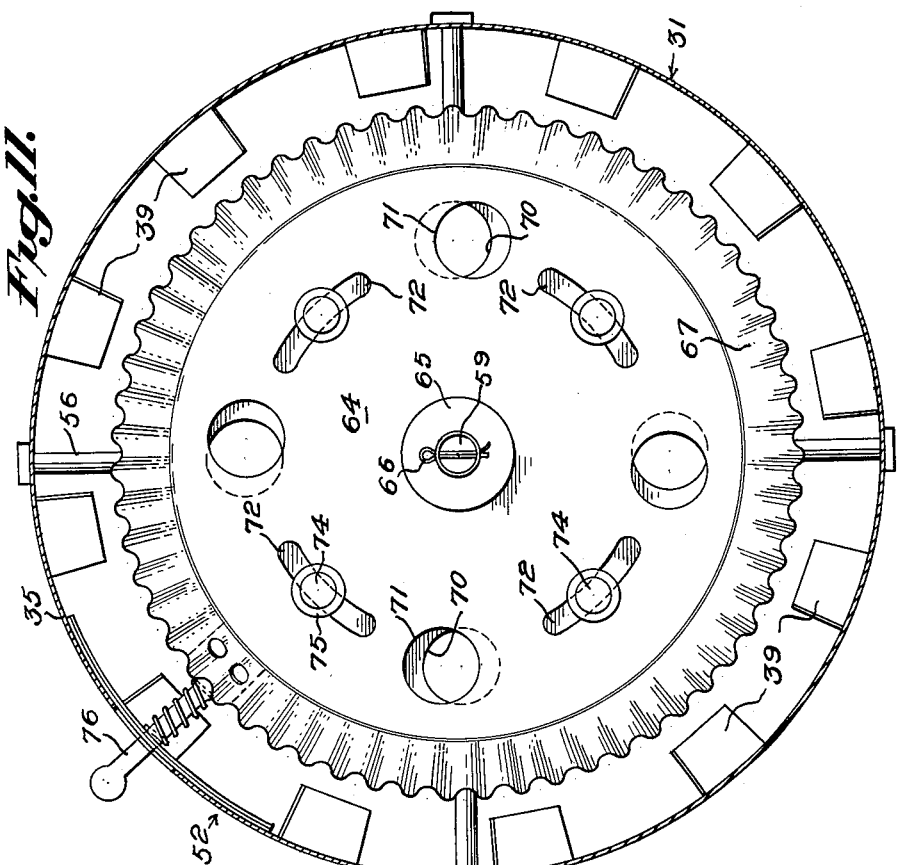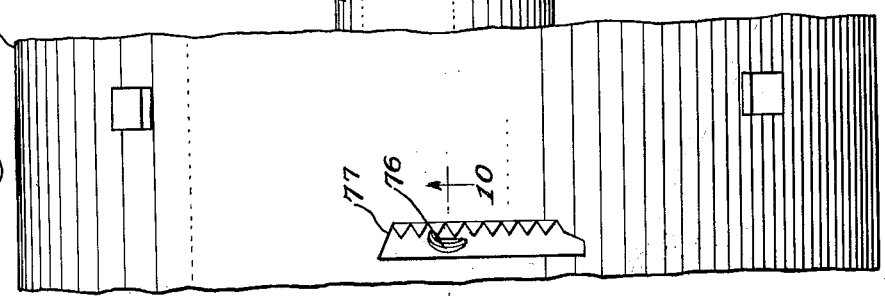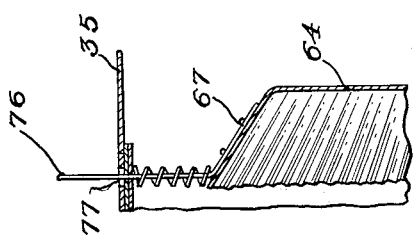

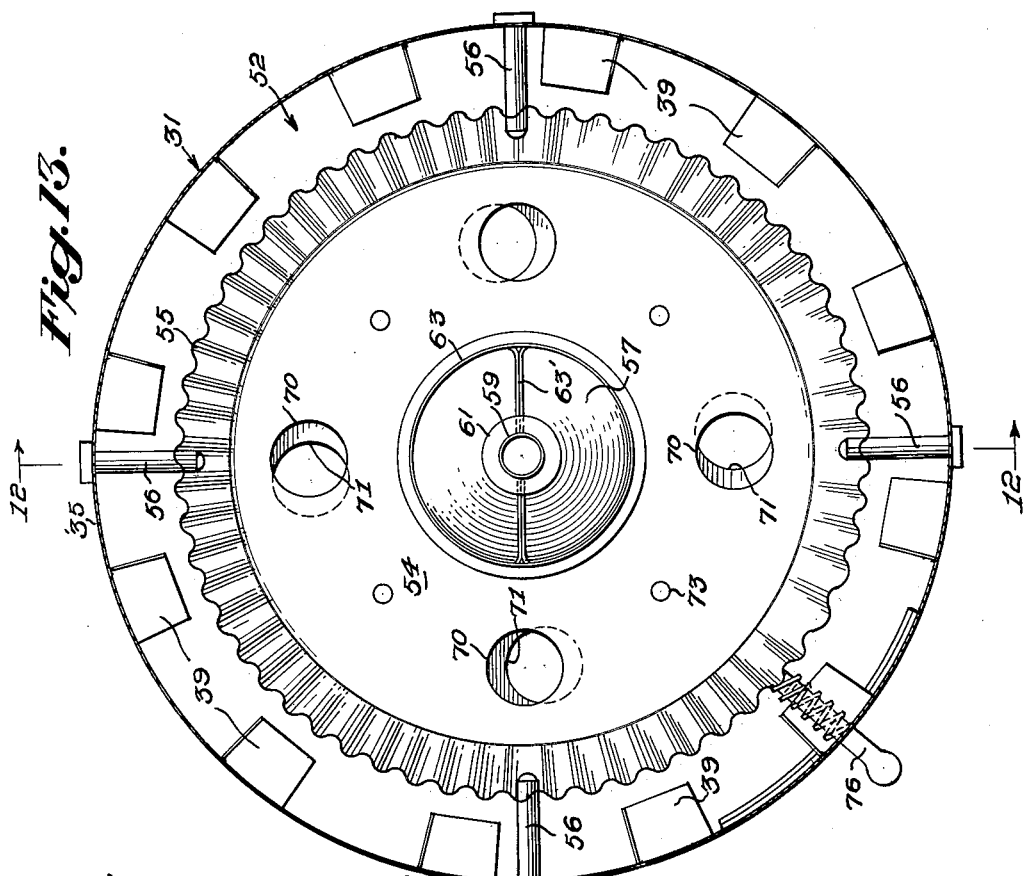
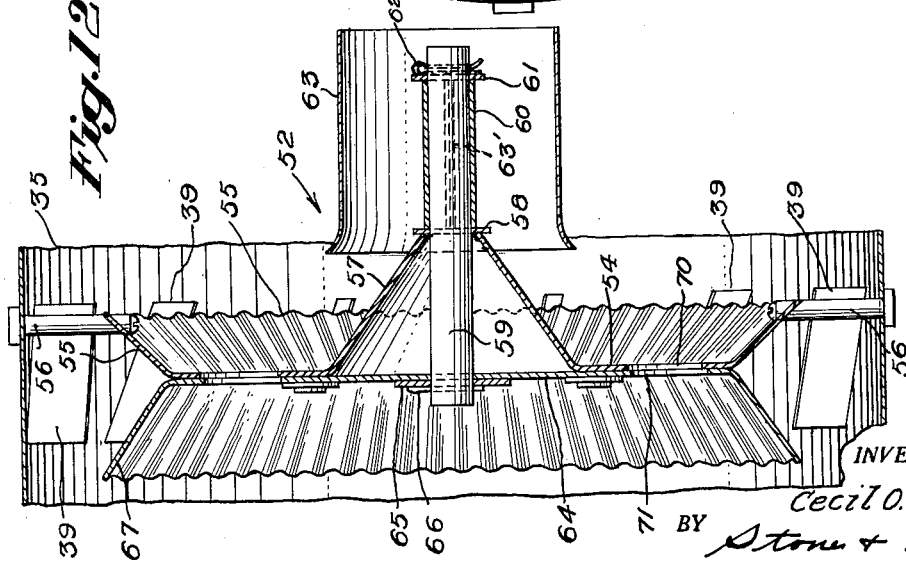

United States Patent Office

3,136,611
Patented June 9, 1964

3,136,611
GRAIN DRIERS
Cecil O. Wright, % Pete's Electric Shop, 3rd South and
Logan Ave., P.O. Box 727, Boise City, Okla.
Filed Dec. 7, 1960, Ser. No. 74,250
12 Claims. (Cl. 34—63)

This invention relates to a grain dryer. The invention is more particularly concerned with an improved dryer for wheat or any other grain having too high a moisture content to store or bin same safely.

The U.S. Government requires that grain be not over a specified moisture for storing thereof. Such requirement applies not only to the more common grains as wheat, oats, barley, rye, etc. but also to maize, kaffir, hygeria, or fall-grain crops.

Grain must be harvested before frost if possible or shortly thereafter for the reason that the heads will break the stalks over during the slightest breeze after it is ripe.

While drying or dehydrating structures have heretofore been proposed and which operated with a measure of efficiency in removing moisture from grain, they failed to meet the maximum requirements of removing moisture from grain prior to the storage thereof.

Accordingly, a primary feature of the present invention is an improved dryer for removal of moisture from grain or the like with maximum efficiency.

A further feature of the invention is an improved grain dryer which generally embodies a rotatable drum having successive heating, drying and cooling sections through which damp grain to be dried is successively fed together with cooperating means within the drum operative to effectively remove moisture from the grain in its passage through the successive heating, drying, and cooling sections of the drum. A still further feature of the invention is an improved grain dryer which is particularly characterized by improved means for effecting transverse movement of the grain during axial movement thereof through the heating and drying sections of the drum for effective drying of the grain.

Other features and advantages of the invention will become apparent in the course of the following detailed description, taken in connection with the accompanying drawings, wherein:

FIG. 1 is an isometric view of a portable frame for supporting a grain drying drum involved in the invention for rotation about the axis thereof;

FIG. 2 is an end elevational view of the frame on a reduced scale together with the rotatably supported drum as viewed from one of the two opposed frusto-conical ends thereof;

FIG. 3 is an end elevational view of the drum together with one of the two pairs of guide rollers rotatably supported by the frame which ride in a circumferential channel member secured to said end of the drum;

Figure 5:
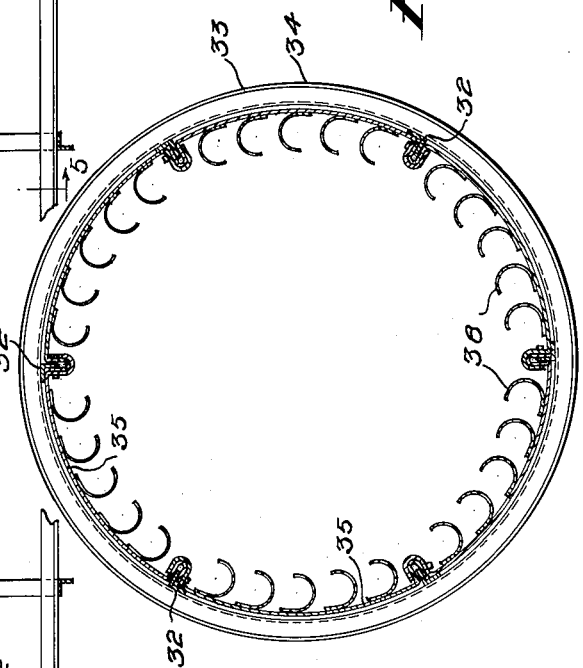
FIG. 5 is a transverse sectional view of the drum as observed in the plane of line 5—5 of FIG. 4, together with the remainder of the drum which includes a plurality of panels, each of which supports a plurality of heating and drying spill cups, transfer baffles, cooling cups, and unloading cups.
Figure 5A:
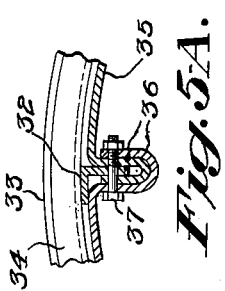

FIG. 5-A is an enlarged sectional view of one of the connections of adjacent ends of a pair of drum plates shown in FIG. 5;

FIG. 5-B is a more or less diagrammatic view generally corresponding to FIG. 5 but which discloses the movement of grain within the drum during rotation thereof;

FIG. 6 is an isometric view of one of the plates or panels above referred to together with the above referred to heating and drying spill cups, transfer baffles, cooling cups, and unloading cups;

FIG. 7 is a vertical longitudinal sectional view of the drum with the opposite end frusto-conical members in elevation, together with a casing which encircles one end of the drum and a grain heating and drying heater, and which also shows a transversely disposed baffle adjacent the opposite end of the drum, and an air blower in communication with the unloading cups, the drum plates being omitted for clarity;

FIG. 8 is a top plan view of the drum and the supporting frame;

FIG. 9 is a fragmentary side elevational view of the drum showing the application of the baffle thereto;

FIG. 10 is a fragmental sectional view of the drum and the baffle as observed in the plane of line 10—10 on FIG. 9;

FIG. 11 is a side elevational view of the baffle as observed from the left side of FIG. 9 and wherein the drum is shown in transverse section;

FIG. 12 is a transverse sectional view of the baffle together with a portion of the drum as observed in the plane of line 12—12 on FIG. 13;

FIG. 13 is a side elevational view of the baffle as opposed to FIG. 11 together with a transverse section of the drum;

FIGS. 14 to 19 inclusive are on a reduced scale and of which FIG. 14 is a front elevational view of the drum showing a modified adaptation of the heater;

FIG. 15 is a side elevational view of the drum shown in FIG. 14;

FIG. 16 is a front elevational view of the drum showing a further adaptation of the heater;

FIG. 17 is a side elevational view of the drum shown in FIG. 16;

FIG. 18 is a front elevational view of a still further adaptation of the heater; and FIG. 19 is a side elevational view of the drum shown in FIG. 18.

Referring now in detail to the drawings, and first to FIG. 1 thereof, the frame 10 will be seen to comprise a rectangular base frame member 11 and a top rectangular frame member 12 and intermediate the base and top frame members are vertical frame members including two pairs of end members 13, two additional vertical members 14 inwardly of but adjacent frame members 13 and central vertical members 15. The lower ends of members 14 and 15 are interconnected by transverse frame members 16 and 17. The opposite sides and opposite ends of the frame include diagonal brace members 18 and 19, and additional diagonal brace members 20 and 21 are provided in the frame members 14.

A central transverse frame member 22 and opposite end transverse frame members 23 are provided and which are disposed in a horizontal plane intermediate the frame members 11 and 12 and which support bearing brackets 24 for a pair of laterally spaced and longitudinally extending shafts 25 and 26, each of which is provided with a friction drive wheel 27 adjacent each end thereof and shaft 25 is provided with a power driven pulley 28 outwardly of the adjacent drive wheel 27.

As is indicated in dotted lines in FIG. 1, the frame 10 is provided with an axle 29 to which one end of a draw bar 30 is connected for propulsion of the frame upon wheels supported by axle 29.

A drum 31 is rotatably supported by the drive wheels 27 for rotation about its axis upon motor power being delivered to shaft 25 through the pulley 28.

Figure 4:
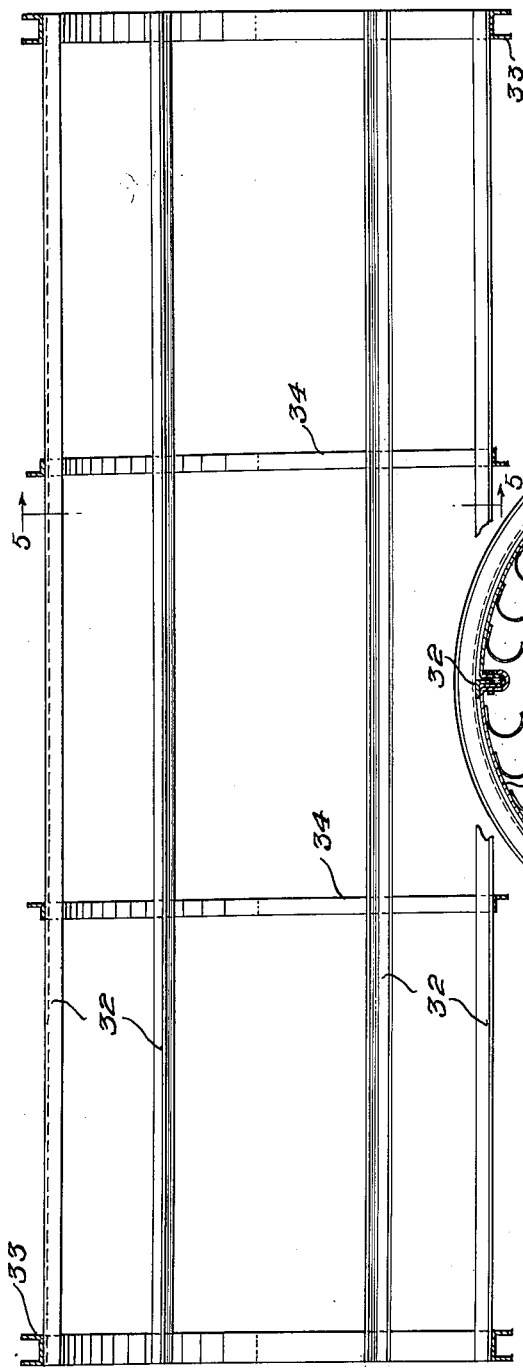
FIG. 4 is a diametrical longitudinal sectional view of the frame work of the drum.

The drum is illustrated in detail in FIGS. 4, 5, 5-A, 6 and 7 and which comprises a generally cylindrical frame as shown in FIGS. 4 and 5. Such frame comprises, a plurality (preferably six) of angle bars 32 extending longitudinally of the drum to which are suitably secured at each of the opposite ends thereof, a circumferential U-channel members 33 and disposed intermediate the channel members 33 and suitably secured to the angle bars 32 are a pair of circumferential angle bars 34 in equally spaced relation to each other and the channel members 33. The channel members 33 provide circumferential tracks for the drum wheels 27.

A sheet metal plate 35 (FIG. 6) is disposed between each pair of angle bars 32 as indicated in FIG. 5 and as is shown in FIG. 6 each plate 35 is provided with opposed marginal curved flanges 36 which in the assembly of the plates extend over the radially inwardly projecting flanges of the angle bars 32 in lapped relation and are secured to said flanges by bolts 37.

Each of the plates 35 is provided with a plurality (preferably five) of successive grain directing members comprising spill cups 38, transfer baffles 39, and spill cups 40 and the plate is further provided with a plurality of unloading cups or dippers 41.

As is indicated in FIG. 7 opposed ends of the drum are provided with frusto-conical members 42 and 43 in the former of which is a loading chute 44 and in the latter of which is an unloading chute 45.

A sheet metal casing 46 surrounds the drum for a substantial length thereof and which preferably extends from the inlet end thereof to the second angle bar 34 as is indicated in FIG. 7 and such casing 46 includes a housing 47 disposed beneath the drum and of a length substantially less than that of the casing 46.

The casing 46 is of substantially two thirds of the length of the drum 31 and includes the heating and drying sections later referred to.

A heater is disposed within the housing 47 in which is disposed internal burners 49 controlled by a thermostat 50 and disposed externally of the casing 47 is a Leech burner 51.

A grain flow control baffle member 52 is disposed within the drum 31 adjacent the rear end thereof within the area containing the transfer baffles 39 shown in FIG. 6, and which baffle member 52 is shown in detail in FIGS. 9 to 13. The baffle member 52 comprises a disc 54 having a corrugated marginal flange 55 which is secured to the plates 35 of drum 31 by bolts 56. The disc 54 is provided centrally thereof with a frusto-conical member 57 whose outer and smaller end is provided with a flange 58. A pin 59 extends axially through member 57 and projects substantially beyond the flange 58. A sleeve 60 surrounds the projecting end of pin 59 and is retained thereon by means of a washer 61 and a cotter pin 62. Disposed concentrically of the pin 59 is a tubular member 63 which is rendered unitary with sleeve 60 by means of webs 63' which are unitary with sleeve 60 and member 63. The inner end of the pin 59 extends through an opening in a second disc 64 and is retained therein by means of a washer 65 and a cotter pin 66. The disc 64 is free of the drum 31 and same is provided with a corrugated flange 67 which together with flange 55 diverge outwardly of the planes of discs 54 and 64.

The disc 54 is provided with apertures 70 and the disc 64 is provided with cooperating apertures 71 and the axes of apertures 70 and 71 are alignable in a common circle concentric to the axis of the pin 59 as is clearly shown in FIG. 11. The disc 64 is rotatable about the axis of pin 59 by the following means. Disc 64 is provided with a plurality of arcuate slots 72 concentric with the axis of pin 59 and a stud 73 having one end thereof secured to disc 54 extends through each slot 72 and is provided with a head 74 between which and the disc 64 is disposed a washer 75.

While the disc 64 is freely rotatable about the axis of pin 59 means is provided for retaining same in any adjusted position relative to the disc 54 and which means comprises a finger engageable tongue 76 rigid with and projecting from flange 67 as is more clearly indicated in FIG. 10. The drum 31 is provided with an elongated slot 77 through which tongue 76 extends and one edge of slot 77 is provided with teeth which are selectively engageable with the tongue 76 for retaining the discs in any selected adjusted position for variation of through air opening provided by the apertures 70 and 71.

As is indicated in FIG. 7 the tubular member 63 telescopes over one end of an elongated tube 80 whose opposite end communicates with an air blower 81.

While it is preferable that the burners extend only about one third the length of the drum for reasons later referred to, such may be of different forms and may also be disposed in different positions as is indicated in the more or less diagrammatic views in FIGS. 14 to 19. Thus FIGS. 14 and 15 depict a burner 90 which is of a plain type and is disposed under the drum. FIGS. 16 and 17 depict a burner 91 which is disposed within the drum, and FIGS. 18 and 19 depict a burner 92 disposed externally of the drum and above the axis thereof.

Having set forth the structure of the improved grain dryer in accordance with a preferred embodiment thereof, the operation is substantially as follows.

Moist grain is fed into the frusto-conical end member 42 through the chute 44. The cylinder is rotated through motor power delivered to the pulley 28 and the cylinder is rotated aproximately 20 to 25 turns per minute. Concurrent with the rotation of the cylinder the heater and the air blower are set into operation.

The moist grain is first heated within the "Heating Section," FIG. 7, to correct temperature controlled by the thermostat 50.

The grain moves relatively slowly through the drum and after having passed the heating section, it enters the "Drying Section" wherein the moisture is removed from the grain. At this point it is to be observed that the heat conserving casing 46 encloses the drying section.

As is indicated by arrows in FIG. 7 air is admitted to the drum by the air blower 81 and same is controlled within the drum by means of the adjustable baffle 52. Air breeze at the heating end of the drum must be very gentle.

The baffle 52 is so adjusted that just sufficient air is passed thereby to exhaust moisture through the cylinder loading end. The dried grain passes through or between the inclined baffles 39 and into the "Cooling Section" of the drum wherein there is a very strong breeze of cool dry air as the arrows in FIG. 7 indicate and the dried grain finally passes through the "Unloading Section." It is to be observed that the diverging flanges 55 and 67 prevent air from retarding action of the transfer baffles 39.

The grain must be dried slowly but cooled quickly. At this point, it is to be observed that the spill cups 38, as is particularly shown in FIG. 5–B, substantially accelerate the drying operation due to the movement of the grain through the transverse area of the drum jointly with its axial movement thereof through the drum.

It is to be further observed that the spill cups 40 have an action similar to that shown in FIG. 5–B whereby the dried grain is subjected to an effective cooling operation.

From the foregoing, it will be understood that as grain is dumped or fed into the loading chute 44, it will tend to spread out over the inner surface of the drum 31 and that such spreading extends lengthwise according as the baffles 38 lift the grain to be dried and drop it into the lower portion of the drum 31. It is obvious that all of the grain will not fall vertically to the inner surface of the drum 31 next adjacent the inlet end but will tend to cover the inner surface of the drum 31 not only in the heating section but also in the drying section (see FIG. 7). It will also be clear that, as the amount of the grain builds up at the intake end of the drum 31, it will tend to flow over into the cooling section and to the unloading section. In the course of that progressive movement of the grain, it will come into contact with the transfer baffles 39 which are inclined to the axis of the drum and serve to move the grain more quickly by reason of the inclination of the blades, as shown in FIG. 6. The spill cups 40 serve to agitate the grain to raise and drop it in the cooling section (FIG. 7) from which area the unloading dippers 41 serve to lift the grain and dump it into the unloading chute 45. It will thus be clear that the structure shown in FIG. 7 will function satisfactorily while on a horizontal axis. However, when it is desired to completely empty the drum 31, as for example at nightfall or whenever it is desired to readjust any parts within the drum 31, the drum may be tilted or inclined to the horizontal by lifting the receiving end 42. This lifting of the receiving end of the drum 31 may be accomplished by the use of suitable jacks beneath the framework shown in FIG. 1.

Further in regard to the passage of the products of combustion produced by the burner 48—51, the following explanation may be helpful. Those products of combustion are supplied to the jacket or outer casing 46 and are discharged from there. (See FIG. 7.) With reference to the casing 46, it will be noted that the top half of the casing which comprises the top half of an oven jacket rests on and is bolted to the angle bars 10—12 (FIG. 1). Casing 46 is built in a half circle and is larger than the drum 31, as will be noted from FIG. 7, and it encircles the drum 31 for about two-thirds of the length of the drum 31. (Also see FIG. 8.) There is about 3 inches of clearance between the drum 31 and the outer casing 46. It will be observed that the advance edge of the drum 46 curves down toward but not completely to the drum 31. To retain heat, there is more than one inch clearance on each end of the casing 46 for the exist of exhaust fumes. Smokestacks are not necessary.

Referring to the housing 47 which contains a heater, it will be noted that the lower half of the oven jacket, encircling the drum 31 in the center portion and curving inwardly toward the drum 31 at the outlet end, has the same configuration as the casing 46 whereas toward the loading end the jacket 47 drops to form a furnace box which is open on its top side toward the drum 31. Further it will be noted that at the loading end of the furnace box the box rises to and encircles the bottom half of the drum 31 with the encircling end curved inwardly to retain heat. (See FIG. 7.) Nevertheless such construction provides ample space for exhaust of gases. The outer casing 46 and the bottom half of the oven jacket 47 completely encircles two-thirds of the drum 31 but is spaced from it. The bottom half of the oven jacket 47 also bolts to the framework similarly to the manner in which the top half 46 is secured to that framework.

Further with regard to the firebox for the burner 49, it may be noted that the firebox may be vented with dampers at the front thereof and that the firebox may have doors to open on either side thereof for access to any burner used within the lower casing 47. The thermostat 50 is placed conveniently near the drum 31 to readily control the heat within the drum 31.

It may be noted also that the Leech burner 51 is bolted to the opening cut in the jacket 46 at about the 2:00 or 2:30 o'clock position. (See FIG. 18.) The burner is mounted in an upside down position to project the heat downwardly and laterally. When used at that position, the grain pans or drums are empty at all times. This novel positioning is a safety measure. Only one burner need be used on any one drier at a given time.

What is claimed is:

1. A grain dryer, comprising a frame, running gear for said frame including an axle for wheels and a draft connection whereby the drier may be moved, an elongated drum having inlet and outlet frusto-conical ends, rotatably supported on the frame, a heat retaining casing surrounding said drum at the inlet end thereof and extending lengthwise of said drum a substantial portion of its length, a heater located exteriorly of said casing and communicating with said casing and adapted to provide heat to the space between said casing and said drum, a baffle disposed within said drum adjacent the rear end of said heat retaining casing and extending diametrically transverse of said drum and mounted on a horizontal axis with respect to said drum and having its peripheral edges spaced from the inner wall of the drum, said drum being one large cylinder the interior surface of which is unobstructed for the passage of grain lengthwise thereof, a plurality of spill cups mounted on the interior surface of said drum and extending substantially throughout the length of said drum, said cups being adapted to raise grain from the bottom portion of said drum to the upper portion thereof and to drop grain as the drum rotates, an air blower, and a tube having one end thereof in communication with said blower and the opposite end thereof opening adjacent said baffle rearwardly thereof.

2. A grain dryer according to claim 1, wherein said elongated drum is provided with U-channel members externally thereof and one adjacent each end thereof and encircling said drum, the U-channel member at the inlet end of the drum being located between the adjacent end of said casing and the adjacent end of said drum and said frame being provided with a pair of elongated laterally spaced shafts, each having a friction drive wheel on each end thereof engageable within said U-channel members, and one of said shafts being provided with a power driven pulley.

3. The structure according to claim 1 wherein said heat retaining casing is of a length substantially equal to two thirds of the length of said drum, the interior of said drum within said heat retaining casing comprising successive heating and drying sections, and the space rearwardly of said baffle providing successive cooling and unloading sections.

4. The structure according to claim 1 wherein said heater is disposed beneath said drum adjacent the inlet end thereof.

5. A grain dryer according to claim 1, wherein said drum comprises a frame including a pair of circular end members of U-channel form in cross section, a pair of circular members of right angular formation disposed between said end members with the spacing between all of said members being substantially uniform, a plurality of longitudinal angle bars disposed within said circular members in equally spaced relation circumferentially thereof, said angle bars having corresponding legs thereof extending radially inwardly, an elongated sheet metal plate disposed between each pair of said legs, and means securing the edges of said plates to said legs.

6. The structure according to claim 5 wherein each of said plates is provided with a plurality of grain directing members adapted to lift grain and drop it during the revolution of the drum.

7. The structure according to claim 6, wherein said grain directing members comprise transversely arcuate spill cups at each side of said baffle for urging movement of grain being dried transversely of said drum.

8. The structure according to claim 6 wherein said grain directing members comprise a plurality of grain transfer baffle plates substantially aligned with said baffle.

9. The structure according to claim 6 wherein said grain directing members comprise a plurality of grain unloading cups.

10. A grain drier, comprising a frame, an elongated drum having inlet and outlet frusto-conical ends, rotatably supported on the frame, a heat retaining casing surrounding said drum at the inlet end thereof, a heater communicating with said casing, a baffle disposed within said drum adjacent the rear end of said heat retaining casing, an air blower, and a tube having one end thereof in communication with said blower and the opposite end thereof opening adjacent said baffle rearwardly thereof, said baffle comprising a pair of discs disposed in contact with each other and at right angles to the axis of said drum, one of said discs having a frusto-conical member projecting rearwardly thereof, a tubular member opposed to said frusto-conical member and being co-axial therewith, said tube extending from said blower and communicating with said tubular member, said discs being provided with alignable air apertures and being adjustable about a common axis for passage of air through the disc in variable volumes.

11. A grain drier, comprising a frame, an elongated drum having inlet and outlet frusto-conical ends, rotatably supported on the frame, a heat retaining casing surrounding said drum at the inlet end thereof, a heater communicating with said casing, a baffle disposed within said drum adjacent the rear end of said heat retaining casing, an air blower, and a tube having one end thereof in communication with said blower and the opposite end thereof opening adjacent said baffle rearwardly thereof, said baffle comprising a pair of discs disposed in contact with each other and at right angles to the axis of said drum, one of said discs having a frusto-conical member projecting rearwardly thereof, a tubular member opposed to said frusto-conical member and being co-axial therewith, said tube extending from said blower and communicating with said tubular member, said discs being provided with alignable air apertures and being adjustable about a common axis for passage of air through the discs in variable volumes, the peripheries of said discs diverging toward said drum and each thereof being corrugated.

12. A grain drier, comprising a frame, an elongated drum having inlet and outlet frusto-conical ends, rotatably supported on the frame, a heat retaining casing surrounding said drum at the inlet end thereof, a heater communicating with said casing, a baffle disposed within said drum adjacent the rear end of said heat retaining casing, an air blower, and a tube having one end thereof in communication with said blower and the opposite end thereof opening adjacent said baffle rearwardly thereof, said baffle comprising a pair of discs disposed in contact with each other and at right angles to the axis of said drum, one of said discs having a frusto-conical member projecting rearwardly thereof, a tubular member opposed to said frusto-conical member and being co-axial therewith, said tube extending from said blower and communicating with said tubular member, said discs being provided with alignable air apertures and being adjustable about a common axis for passage of air through the discs in variable volumes, the peripheries of said discs diverging toward said drum and each thereof being corrugated, one of said discs being secured to said drum and a plurality of grain transfer baffles projecting inwardly from said drum and being disposed between said diverging peripheries of said discs.

References Cited in the file of this patent
UNITED STATES PATENTS

| | | |
|---|---|---|
| 256,940 | Worrell | Apr. 25, 1882 |
| 1,477,823 | Grindle | Dec. 18, 1923 |
| 2,380,652 | Jorgenson et al. | July 31, 1945 |
| 2,492,792 | Ford | Dec. 27, 1949 |
| 2,716,936 | Kopf | Sept. 6, 1955 |
| 2,746,170 | Wilson et al. | May 22, 1956 |
| 2,939,693 | Old et al. | June 7, 1960 |
| 3,076,269 | Hagen | Feb. 5, 1963 |

FOREIGN PATENTS

| | | |
|---|---|---|
| 774,397 | Great Britain | May 8, 1957 |
| 818,014 | Great Britain | Aug. 12, 1959 |